United States Patent [19]

Pekala

[11] Patent Number: 4,873,218

[45] Date of Patent: Oct. 10, 1989

[54] LOW DENSITY, RESORCINOL-FORMALDEHYDE AEROGELS

[75] Inventor: Richard W. Pekala, Pleasant Hill, Calif.

[73] Assignee: The United States Department of Energy, Wash.

[21] Appl. No.: 199,404

[22] Filed: May 26, 1988

[51] Int. Cl.[4] .......................... B01J 20/02; C08J 9/28
[52] U.S. Cl. .................................... 502/418; 502/437; 521/64; 521/181
[58] Field of Search ................. 502/418, 437; 521/64, 521/181

[56] References Cited

U.S. PATENT DOCUMENTS

| 4,221,873 | 9/1980 | Volodko et al. | 521/181 |
| 4,309,527 | 1/1982 | McAllister et al. | 521/181 |
| 4,336,170 | 6/1982 | Horüke et al. | 521/181 |
| 4,409,361 | 10/1983 | McAllister et al. | 521/181 |

*Primary Examiner*—Morton Foelak
*Attorney, Agent, or Firm*—Shyamala T. Rajender; L. E. Carnahan; Judson R. Hightower

[57] ABSTRACT

The polycondensation of resorcinol with formaldehyde under alkaline conditions results in the formation of surface functionalized polymer "clusters". The covalent crosslinking of these "clusters" produces gels which when processed under supercritical conditions, produce low density, organic aerogels (density $\leq 100$ mg/cc; cell size $\leq 0.1$ microns). The aerogels are transparent, dark red in color and consist of interconnected colloidal-like particles with diameters of about 100 Å. These aerogels may be further carbonized to form low density carbon foams with cell size of about 0.1 micron.

15 Claims, No Drawings

LOW DENSITY, RESORCINOL-FORMALDEHYDE AEROGELS

The United States Government has rights in this invention pursuant to Contract No. W-7405-ENG-48 between the United States Department of Energy and the University of California for the operation of the Lawrence Livermore National Laboratory.

BACKGROUND OF THE INVENTION

The invention described herein pertains generally to organic gels and more specifically to organic aerogels and methods for their preparation.

Foamed organic polymers and organic foam composite materials are well known and are used in the insulation, construction and similar industries. These foams, generally, are of relatively high density and are not suitable for applications where very low density ($\leq$ 100 mg/cc) organic foams are needed, such as in many high-energy physics applications, or as parts for inertial confinement fusion targets. Another requirement for such organic materials are not only the very low density, but generally at least over an order of magnitude smaller in cell size than foams produced using other conventional techniques such as the expansion of polymer/blowing agent mixtures, phase-separation of polymer solutions and replication of sacrificial substrates, to name a few. Some of these prior art methods have produced phenol-formaldehyde and phenol-urea foams but again, these foams have a compact cellular structure and densities much greater than the 100 mg/cc level required for high-energy physics applications. The following patents exemplify the phenol-formaldehyde and phenol-urea type of resins produced using the earlier-mentioned conventional techniques.

U.S. Pat. No. 4,694,028, issued Sept. 15, 1987, to Yukio Saeki et al., describes a method for the production of a phenol resin foam exhibiting a compact cellular structure, a high closed cell ratio and improved heat resistance.

U.S. Pat. No. 4,576,972, issued Mar. 18, 1986, to James Lunt et al., discloses closed cell foams produced from modified, low cost phenol formaldehyde resoles. These foams exhibit high closed cell content, low friability and low thermal conductivity.

U.S. Pat. No. 4,546,119, issued Oct. 8, 1985, to James Lunt et al., teaches a foam produced from phenolic resins and a method for the production thereof. These foams have low thermal conductivity and low friability.

U.S. Pat. No. 4,525,492, issued June 25, 1985, to Mary H. Rastall et al., discloses a modified phenolic foam produced from phenol-formaldehyde resins with a phenol to formaldehyde ration of about 1:3 and 1:4.5. These foams are thermally stable, fire resistant and low in cost.

U.S. Pat. No. 4,489,175, issued Dec. 18, 1984, to Heinz Baumann, describes a method for the preparation of an urea formaldehyde combination foam with a low content of formaldehyde which is dimensionally stable.

U.S. Pat. No. 4,417,004, issued Nov. 22, 1983, to Krishnan K. Sudan, teaches a two-part pack for the in-situ production of a phenol formaldehyde foam. The packs contain premixed ingredients which are placed at the site and mixed to produce the foam at the desired site.

While these foams are useful for thermal insulation in the building industry, the methods or the materials produced by these prior art methods do not exhibit the desired low density, the continuous porosity or the ultra-fine cell size ($\leq$ 0.1 microns) required for high energy physics applications or as parts for inertial confinement fusion targets.

A few low density foams that have been produced are illustrated in the following patents:

U.S. Pat. No. 4,602,048, issued July 22, 1986, to Harold R. Penton et al., discloses a composition of low density polyphosphazene foam made from gums which are substituted with phenoxy, alkyl phenoxy and alkenyl phenoxy substituents. The preferred alkyl phenoxy groups are those where the alkyl group contains 1-4 carbon atoms. Fillers include inorganic materials such as carbon black or glass fibers.

U.S. Pat. No. 4,595,623, issued June 17, 1986, to Preston S. Du Pont et al., describes a fiber-reinforced, syntactic foam composite with a low specific gravity. The foam is produced by dispersing microscopic particles in a thermosetting composition and then curing. The particles incorporated may be carbon or phenolic resins. Carbon fibers are added to the syntactic foam to improve the strength of the composite.

U.S. Pat. No. 4,465,792, issued Aug. 14, 1984, to Donald G. Carr et al discloses a flexible foam composition in which inorganic reinforcements such as carbon fibers, glass, paper, cloth or woven tape, may be incorporated. Accelerators and promoters, such as commercially available naphthenates may be added to supply metal ions to improve the cure time.

U.S. Pat. No. 4,049,613, issued Sept. 20, 1977, to Dwain M. White, discloses a method for the production of carbon fiber-polyetherimide matrix composites, with high strength and superior solvent resistance. Dihydric-phenols can be used to make alkali metal diphenoxides which are then used to make the polyetherimides.

However, these materials do not exhibit the desired low density, the stability or the ultra fine cell structure and are thus not suitable for applications in high energy physics or as parts for inertial confinement fusion targets. The current production of low density materials (less than 100 mg/cc) with ultra-fine pore sizes (less than 1 micron) has largely been limited to aerogel technology, particularly to silica aerogels.

Gels are a unique class of materials which exhibit solid-like behavior resulting from continuous, three-dimensional framework extending throughout a liquid. This framework consists of molecules interconnected through multifunctional junctions. These junctions can be formed through covalent crosslinking, crystallization, ionic interactions, hydrogen bonding or chain entanglements. In some cases, junction formation is reversible and the gels revert to liquid-like behavior upon a change in temperature.

Gels have been synthesized for a variety of applications, and their properties studied for these various applications. The following examples illustrate a few of these applications. Electrophoresis of protein mixtures is quite often performed with crosslinked polyacrylamide gels. Some chromatographic packings are composed of styrene/divinyl benzene gel particles. Hydrogels containing 2-hydroxyethyl methacrylate are used in many soft contact lens applications. Thus, the gel framework is tailored to the specific end use. As an example, the molecular weight between crosslinks partially determines the water content of a soft contact lens.

In other examples, these gels serve only as an intermediate phase in materials processing. High modulus fibers are made by solution spinning a polyethylene/decalin solution, quenching the filaments to form a gel, and stretching to a high draw ratio. Gels produced from the phase separation of dilute polymer solutions serve as precursors to membranes and low density foams.

Sol-gel processing of ceramics has gained considerable attention in recent times because various metal oxides can be formed from gels at relatively low temperatures when compared to conventional melt processing. In the case of silica gels, the solvent is slowly evaporated to form a dry, porous xerogel which can be sintered into a glass. If the solvent is removed from the silica gel by a supercritical drying process, a transparent low density foam results. Foams of this type are referred to as inorganic aerogels. In these systems, solutions of the appropriate constituents are reacted to form colloidal particles which are covalently linked together to form a three-dimensional network. The solvent for the reaction is carefully removed using a procedure such as critical point drying, resulting in a low density aerogel which is translucent because the ultra-fine pore size minimizes light scattering.

Silica gels, generally, are produced from the polycondensation of tetramethoxy silane (TMOS) or tetraethoxy silane (TEOS) in the presence of an acid or base catalyst. Under acidic conditions, linear or slightly branched polymers are formed which entangle and then crosslink to form a gel. Under alkaline conditions, the reaction produces branched polymeric "clusters" which crosslink together. This is similar to gel formation from the destabilization of colloids. The size of the "clusters" and their interpenetration can be manipulated under appropriate reaction conditions.

The small cell size ($\leq 500$ Å) of the silica gel necessitates supercritical drying. Large capillary forces at the liquid-vapor interface cause the silica gel to shrink or crack if the solvent is removed by evaporation. In the case of supercritical drying, no surface tension is exerted across the pores, and the dry aerogel retains the original morphology of the silica gel.

Silica gels are unaffected by the solvent which fills their pores. The gel can be exchanged into an organic solvent from its original alcohol/water environment without swelling or deswelling. In gels such as crosslinked polystyrene, on the other hand, the solvent interaction parameter determines the equilibrium swelling behavior.

In spite of the many advantages of these silica aerogel systems, the presence of silicon ($Z=14$) in the composition, however, often limits its effectiveness for many applications, such as in high energy physics or as parts for initial confinement fusion targets and the like, where a low number for Z (atomic number) is preferred. Pure organic foams or aerogels, consisting of mostly carbon ($Z=6$), and hydrogen ($Z=1$) with some oxygen ($Z=8$), would be suitable for such applications, if stable, low density aerogels of ultra-fine pore size could be produced. However, no relationship or analogy has been stated to exist between silicic acid polymerized in an aqueous system and condensation-type organic polymers.

A need exists, therefore, to produce low density organic foams or aerogels which exhibit continuous porosity gels, for applications in high energy physics, parts for inertial confinement fusion targets, and, with modifications, for other applications such as chemical catalysis and ion exchange reactions.

Accordingly, it is an object of the present invention to provide different types of low density organic aerogels which exhibit continuous porosity and ultra fine cell size of the order of about 0.1 microns.

Still another object is to provide low density organic aerogels with a density of $\leq 100$ mg/cc.

Another object of the invention is to provide a synthetic route for the production of the organic aerogels.

Yet another object is to produce organic aerogels from formaldehyde and other phenolic substances.

Still another object of the invention is the incorporation of other organic and inorganic components into the aerogels.

Yet another object is to provide carbonized aerogels of low densities and ultra-fine cell size.

An additional object is to provide modified aerogels which would be suitable for applications in chemical catalysis and ion exchange reactions.

Another object is to provide a low density, inertial confinement fusion targets with $Z=8$ or less.

Additional objects, advantages and novel features of the invention, together with additional features contributing thereto and advantages accruing therefrom will be apparent from the following description and the accompanying illustration of one or more embodiments of the invention and the description of the preparation techniques therefor, as described hereinafter. The objects and advantages of the invention may be realized and attained by means of the instrumentalities and combinations particularly pointed out in the appended claims.

SUMMARY OF THE INVENTION

To achieve the foregoing and other objects, and in accordance with the purpose of the present invention as embodied and broadly described herein, one aspect of the present invention provides, a synthetic route for the production of organic aerogels which exhibit low densities, continuous porosity and ultra fine cell size and a $Z=8$ or less. The method broadly comprises mixing a phenolic substance, such as a polyhydroxy benzene, preferably a di- and tri-hydroxy benzene, still more preferably resorcinol (1,3-dihydroxy benzene) or mixtures of resorcinol and catechol or resorcinol and hydroquinone or resorcinol and phloroglucinol, most preferably resorcinol, with formaldehyde, in the presence of a base catalyst to form a polymeric gel. Sodium carbonate is a suitable base catalyst, although other catalysts may be employed. The gel so formed is then exchanged into a suitable organic solvent and supercritically dried with carbon-dioxide. These aerogels may be further carbonized to yield carbon foams of low densities and ultra-fine cell sizes.

In some preferred embodiments, the reactants are heated to a temperature in the range of about 70° to about 100° C., preferably about 85° C., to form the gel. The gel so formed is then placed in dilute acid to increase the crosslinking density of the gel. The gel is then exchanged into an organic solvent that is appropriate for supercritical drying, after which it is supercritically dried.

Other reactant systems which form a gel before precipitating would be suitable for formation of aerogels by the condensation polymerization reaction of the present invention. These include but are not limited to 1,3,5-trihydroxybenzene-formaldehyde, melamine-formaldehyde, ureaformaldehyde, and phenyldiamine-formaldehyde.

The organic aerogels or foams of this invention are stable, transparent and exhibit low densities (35 to 100 mg/cc) and are also of uniform, microcellular structure or of ultra-fine pore size ($\leq 0.1$ microns). They are machinable into any desired shape, for the particular use contemplated. Other organic materials such as dihydroxy benzoic acids and other metal salts may also be incorporated into these aerogels to expand the range of their application. Because of their low Z, these aerogels are useful in high energy physics applications, and as parts for inertial confinement fusion targets. They are also useful as chromatographic separation media, ion exchange media and as catalysts for many commercial processes. The aerogels of this invention may also be used as thermal insulators for solar cells, in acoustics technology and the like.

DETAILED DESCRIPTION OF THE INVENTION

The present invention is directed broadly to a method for the synthesis of low density, stable, microcellular, organic aerogels of uniform, ultra-fine pore size, with $Z=8$ or less, and to organic aerogels produced by the method. The method comprises reacting a polyhydroxy benzene with formaldehyde in an appropriate ratio to form a crosslinked network. An excess of formaldehyde is used to maximize the crosslinking density of the gel. Preferred polyhydroxy benzenes are di- and tri-hydroxy benzenes, such as catechol, resorcinol, phloroglucinol, hydroquinone, and mixtures thereof. The most preferred is the 1,3-dihydroxy benzene, resorcinol and mixtures of resorcinol with other di- and tri-hydroxy benzenes.

More specifically, the method comprises reacting the polyhydroxy benzene with formaldehyde in a predetermined ratio, in the presence of a base catalyst, such as sodium carbonate, in an aqueous solution, at an elevated temperature and for a sufficiently long period of time, to form a gel. Temperatures in the range of from about 70° C. to about 100° C. may be employed, 85° C. being preferred. A minimum of about 36 hours are required for necessary crosslinking to form the gel. A range from about 48 hours to about seven or eight days have been found to be preferable. The gel thus formed is then acid-washed to remove sodium salts and the excess base and to promote further crosslinking of the gel, which imparts stability to the gel structure. The gel is then solvent exchanged to replace the water retained in the gel pores with a suitable organic solvent. Such solvents include but are not limited to methanol, acetone, isopropanol and amyl acetate. Acetone is the preferred solvent, when resorcinol is used as the dihydroxy benzene. After the solvent exchange, the gel is dried by super critical drying using carbon-dioxide and characterized in terms of its density, microcellular structure or pore size and spectral characteristics.

In a preferred embodiment, the reaction of resorcinol with formaldehyde generally in a 1:2 molar ratio, in the presence of catalytic amounts of a base catalyst such as sodium carbonate, results in gel formation because resorcinol is trifunctional (i.e., activated in the 2, 4, 6 ring positions) and formaldehyde is bifunctional. The following equation illustrates the reaction scheme and the formation of a crosslinked polymer network.

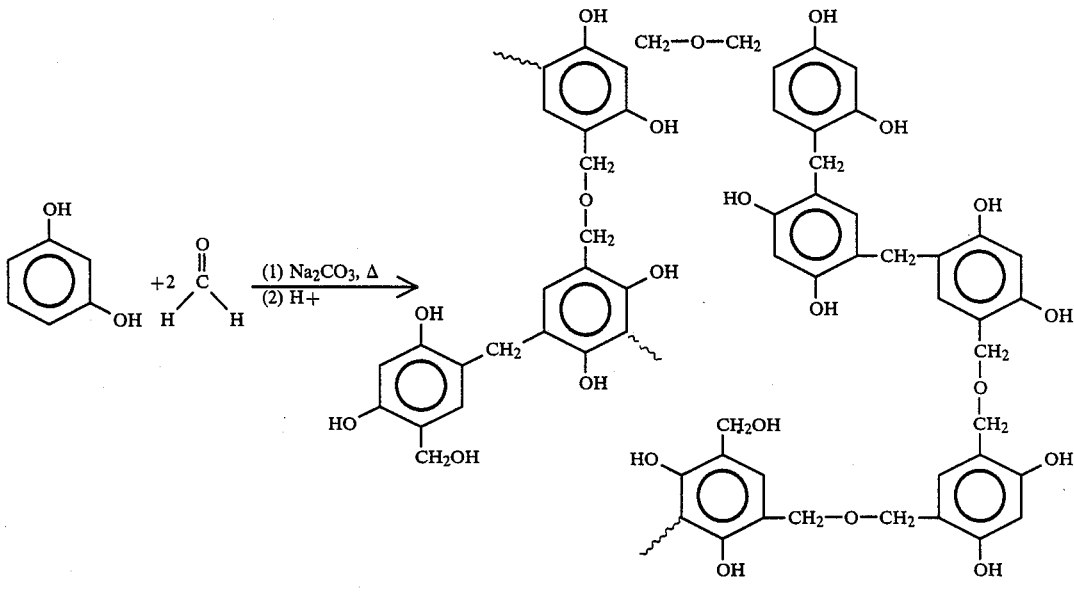

Crosslinked Polymer

The reaction typically results in methylene bridges between the resorcinol molecules with some hydroxymethyl groups also present. These hydroxymethyl groups can be made to self-condense in the presence of an acid to form ether bridges and provide additional crosslinking.

The reaction shown in equation 1, may be conducted with a variety of phenolic monomers such as phenol, resorcinol, catechol, hydroquinone and phloroglucinol and/or mixtures thereof. For the resorcinol-formaldehyde reaction, the initial pH of the mixture is maintained in the range of about 6.5 to about 7.4 to form a transparent gel. As the reaction progresses, and formaldehyde is consumed, the pH decreases as numerous hydroxymethyl ($-CH_2H$) groups are formed. The relative polarity of the substituents thus determines the water solubility of the polymer molecules.

An examination of the residual formaldehyde content in the resorcinol-formaldehyde solution as a function of cure time reveals that a majority of the formaldehyde is consumed within 4 hours at a reaction temperature of about 85° C. Nonetheless, a cure time of at least 12-16 hours, depending upon the desired density level, have been found to be necessary for a polymeric gel to form. An equilibrium formaldehyde content is approached after 24 hours, and the mechanical properties of the gel are then dominated by intermolecular crosslinking.

Although the resorcinol-formaldehyde mixtures gelled within 24 hours, it has been found to be necessary to cure the gels for a minimum of 3 days before they could be easily handled in subsequent processing. Without this additional cure time, gravity caused the gels to deform under their own weight. A standard cure time of 7 days has been selected because compression modulus measurements show that the gels reach an asymptotic value after this period of time.

After the various gels have been soaked in a dilute acid solution, such as for example, a 0.1% solution of trifluoracetic acid, a perceptible increase in the compression modulus has always been observed. The compression modulus of gels synthesized at different catalyst levels show a trend in which a higher modulus is obtained at high catalyst levels i.e., at higher pH. At initial catalyst concentrations of 1.5, 2.0, and 3.0 mM, the corresponding gels have compression moduli of 0.027, 0.047, and 0.055 MPa, respectively.

Resorcinol-formaldehyde foams produced by the method of this invention exhibit a variety of densities between about 35-100 mg/cc. The foams are higher in density than their theoretical values because of shrinkage during the drying step. In general, the shrinkage has been observed to be about 33% by volume. Gels with lower compression moduli exhibited less shrinkage during drying, i.e., gels synthesized at low catalyst levels resulted in foams which corresponded more closely to their theoretical density. All the foams were transparent, red in color and showed an openly porous structure with cell sizes less than 0.1 microns. The aerogels produced by the method of the present invention may also be carbonized by heating them to temperatures in the range of about 600° to about 1200° C., in a nitrogen atmosphere, to yield carbon foams of very low densities and ultra-fine cell size or microcellular structure. Since the aerogels produced by the method of the present invention, when supercritically dried, result in dry foams, the terms "aerogel" and "foam" have been used interchangeably in the description of the preferred embodiments and in the claims. Such use is not to be construed as limiting the product to one or the other of the two forms, aerogel or foam.

Some of the dry foams have been machined for further mechanical testing. The machined parts are dimensionally stable with flat, smooth surfaces and may be machined into any desired shape depending upon the contemplated use.

Some alkaline metal salts, such as lithium, sodium, potassium, ammonium salts, of various dihydroxy benzoic acids, such as for example, 2,4-dihydroxy benzoic acid, may also be incorporated into the foam matrix during synthesis. After the polymerization other metal ions and metal salts such as lead acetate, rubidium carbonate, thallium acetate and the like, may also be incorporated into the crosslinked network. These modified gels may be acidified with a suitable acid such as chloracetic acid to expose the original carboxyl groups, for the incorporation of metal ions or other cations. Other functional groups or moieties may also be attached to the gel, as desired, for use in ion exchange reactions such as the removal of contaminant metal species from waste water and the like or as chromatographic separation media. Carbon foams formed by the carbonization of the aerogels of this invention, may be further used as structural parts where X-ray opacity may be a requirement.

The following examples best serve to illustrate the principles of the present invention and describe preferred embodiments thereof. They are not to be construed as limiting the invention in any manner or to any precise form.

EXAMPLE 1

Gel Preparation

Resorcinol (98% purity) was purchased from Aldrich Chemical Company and was used without further purification or other treatment. Formaldehyde was obtained from J. T. Baker Chemical Company as an aqueous solution (37.5%; methanol stabilized). Sodium carbonate monohydrate was supplied by Mallinckrodt, Inc. All solutions were prepared with deionized and distilled water. A typical gel formation contained 0.29M resorcinol, 0.57M formaldehyde and 1.5 to 4.0 mM sodium carbonate for a total of 5.0% solids. In some cases, gels were synthesized at concentrations as low as 2.0% solids, but the molar ratio of formaldehyde-resorcinol was held at a constant value of 2. For purposes of illustration, Table I presents the various formulations of the resorcinol-formaldehyde system used in this invention. Other dihydroxy and trihydroxy benzene compounds such as catechol, hydroquinone, phloroglucinol, and various mixtures thereof, were also found to form gels.

After weighing out the desired formulation, the solution was stirred and the initial pH was recorded. A pH range of 6.5-7.4 was employed. At an initial pH below 6.0, an opaque gel or precipitate was formed upon heating. Mixtures with an initial pH greater than 7.5 were not evaluated. The pH of all formulations was lowered as the condensation reaction progressed.

The resorcinol/formaldehyde mixture was decanted into 19 mm × 107 mm glass ampoules (10 cc capacity). The ampoules were sealed with an acetylene torch, and placed in an oven at 85°±3° C. for seven (7) days. progressively changed color from clear to yellow to orange to deep red as a function of the reaction time. Gel time was a function of the percent solids in the

TABLE I

| Formulation | % Solids | [Formaldehyde] | [Resorcinol] | Na$_2$CO$_3$ | Theoretical density (g/cc) | Actual Density (g/cc) |
| --- | --- | --- | --- | --- | --- | --- |
| A | 5.0% | 0.29 M | 0.58 M | 0.0029 M | 0.050 | 0.079 |
| B | 5.0% | 0.29 M | 0.58 M | 0.0019 M | 0.050 | 0.073 |
| C | 5.0% | 0.29 M | 0.58 M | 0.0015 M | 0.050 | 0.070 |
| D | 4.0% | 0.24 M | 0.47 M | 0.0012 M | 0.040 | 0.054 |
| E | 3.5% | 0.21 M | 0.41 M | 0.0010 M | 0.035 | 0.044 |
| F | 2.0% | 0.12 M | 0.24 M | 0.0006 M | 0.020 | 0.030 | mixture and the catalyst level. Solutions containing 5.0% and 3.5% solids (Formulations C and E) gelled in approximately 16 and 30 hours, respectively. The extended 7-day cure was found to be necessary so that the gels could support their own weight and be handled in subsequent processing.

Upon completion of the cure cycle, the glass ampoules were removed from the oven and cooled to room temperature. A small amount of liquid from syneresis was usually found at the top of the gel. In addition, the gels were always darker at the gel/air interface as a result of slight oxidation. After scribing the bottom of the glass ampoules with SiC tipped pencil, a red-hot glass rod was used to shatter the glass. The gels did not adhere to the glass walls of the ampoules and were easily removed

EXAMPLE 2

Solvent Exchange

After removal from the ampoules, the resorcinol-formaldehyde gels were placed in an agitated bath of 0.125% trifluoracetic acid at 45° C. for three days (pH=1.9 at Room Temperature). The acid wash assisted in further condensation of hydroxymethyl groups ($-CH_2OH$) remaining in the gels to form ether bridges between resorcinol molecules. The acid wash treatment resulted in an increase in the compressive modulus of the gels.

In preparation for critical point drying, the acid-filled gels were then placed into an agitated acetone bath at 45° C. Multiple exchanges with fresh acetone were used to remove the residual water. Usually, nine resorcinol-formaldehyde gels were placed in a 4 liters of fresh acetone on a daily basis for four days. The acetone was heated to accelerate the diffusion of water from the gel. Other solvents which were successfully used in the exchange process included methanol, isopropanol and amyl acetate. Any solvent which is miscible with carbon dioxide may be used in the exchange step.

The resorcinol-formaldehyde gels remained transparent independent of the refractive index of the solvent used in the exchange, indicating that the cell size of the gels was less than the wavelength of light in the visible range.

EXAMPLE 3

Critical Point Drying

Nine acetone-filled gels were placed on perforated stainless steel racks in an 85 mm diameter long jacketed pressure vessel (Polaron Equipment Ltd., Watford, England). Trapped air was slowly bled from the vessel while it was filled with liquefied carbon dioxide at 900 psi and a jacket temperature of 14° C. The jacket temperature was controlled to ±0.5° C. with a circulating bath containing 50/50 ethylene glycol/water.

The resorcinol-formaldehyde gels were allowed to stand in the liquefied carbon dioxide for a minimum of four hours before flushing the system. After partial exchange of the acetone with carbon dioxide, the gels were buoyant as observed through the window of the Polaron. After this initial induction period, carbon dioxide was drained from the vessel to a level just above the resorcinol-formaldehyde gels. The vessel was then refilled with carbon dioxide. This drain/refill procedure was conducted four times daily. The resorcinol-formaldehyde gels were also flushed with carbon dioxide in a flow-through manner for a minimum of four hours per day to assist in removing acetone from the pores of the resorcinol-formaldehyde gel and replacing it with carbon dioxide. In this process, diffusion was solely responsible for removal of the acetone. Three days were generally required to remove all acetone from the resorcinol-formaldehyde gels.

At this point, the $CO_2$ valve and exit valve of the pressure vessel were closed and the jacket temperature was increased to 45° C. The critical point for $CO_2$ is 1100 psi at 31° C. Carbon dioxide was vented manually from the system at pressures greater than 1300 psi. Dry resorcinol-formaldehyde aerogels were subsequently recovered by slowly bleeding the Polaron to atmospheric pressure while maintaining the temperature at 45° C.

The resorcinol-formaldehyde aerogels were held in front of a high intensity white light to ensure that the drying process was successful. If the acetone was not completely exchanged with $CO_2$, the aerogels were opaque in the region where the acetone had been present.

EXAMPLE 4

Characterization Techniques

The consumption of formaldehyde was determined as a function of polymerization time using a titration method. Approximately 10 grams of a resorcinol-formaldehyde solution or pulverized gel was added to 100 ml of 90% ethanol. This solution was titrated with 0.2N hydrochloric acid to a greenish-yellow end point using bromophenol blue as an indicator. To this mixture, 25 ml of 5% hydroxylamine hydrochloride solution was added. The resulting acidic solution was allowed to stand for ½ hour while hydrochloric acid was liberated during the reaction with free formaldehyde. The solution was titrated with 0.1N sodium hydroxide to a final end point at pH=3.4. One ml of 0.1 N sodium hydroxide was equivalent to 0.0030 grams of formaldehyde.

Molecular weight distributions for aliquots from the resorcinol-formaldehyde polymerization were obtained by gel permeation chromatography. Polystyrene standards (Pressure Chemical) were used to calibrate the Bimodal PSM60S and PSM 1000S columns (Dupont). In addition, a resorcinol-novolac polymer was used to evaluate the columns. This polymer was synthesized under acidic conditions at a formaldehyde:resorcinol mole ratio of 0.8. It contained no hydroxymethyl groups and was not capable of crosslinking by itself.

All gel permeation chromatography experiments were performed in inhibitor-free tetrahydrofuran at a flow rate of 1.0 ml/min. Samples were not filtered before injection. A UV detector set at 273 nm monitored the molecular weight profiles.

Thermal analysis of resorcinol-formaldehyde gelation was performed with a differential scanning calorimeter (Perkin Elmer DSC 7) attached to a PE 3700 data station. All samples were placed in DSC pans with a silicone O-ring seal so that they could be scanned above the boiling point of the solution. Sample size was approximately 65 milligrams. Heating rates varied from about 3° K. to about 12° K. per min.

All infrared spectra were recorded on a Digilab FTS-40 spectrophotometer attached to a 3240-SPC computer station. A vibratome was used to cut 0.25 mm thick pieces from the resorcinol-formaldehyde aerogels. These thin samples were dessicated for 24 hours and then placed between two sodium chloride windows. IR spectra were acquired between 4000 and 500 cm$^{-1}$ using 64 scans.

Surface areas of the resorcinol-formaldehyde aerogels were obtained from nitrogen adsorption analysis (Digisorb 2600). In order to remove liquid and gaseous contaminants, all samples were placed under vacuum ($10^{-5}$ Torr) for 24 hours at 25° C. prior to analysis. The standard deviation for surface area measurements was typically 2% of the reported values.

Scanning electron microscopy (Hitachi S-800) and transmission electron microscopy (Jeol 200CX) were used to examine the morphologies of resorcinol-formaldehyde aerogels. SEM was performed on uncoated samples at an accelerating voltage of 10 kV. TEM samples were atomized onto Formvar grids and analyzed at 80 kV.

EXAMPLE 5

Monitoring RF Reaction

The resorcinol-formaldehyde reaction was monitored by titrating free formaldehyde as a function of polymerization time using the hydroxylamine hydrochloride procedure. The rate of the reaction was found to depend upon the catalyst level. However, the reaction was found to be first order only during the initial three hours. FIG. 2 represents the kinetic data obtained with formulations A, B and C. The inflection point at three hours shows that approximately 60 percent of the original formaldehyde has been consumed, and the point at which the majority of the resorcinol-formaldehyde "clusters" appear to have been formed. From that point on, the reaction depends primarily on the cross-linking of these "clusters" to form a gel. This would be the slow, rate-determining step for the gelation process.

BET nitrogen adsorption studies showed that the surface area of the resorcinol-formaldehyde foams was related to the initial catalyst level. For foams synthesized at catalyst levels of 1.5, 2.0 and 3.0 mM, the resulting surface areas were 513, 620, and 717 sq.m./g, respectively.

Thermal properties of the foams were analyzed by differential scanning calorimetry (DSC) and thermal gradient analysis (TGA). DSC traces of the foams revealed a large endothermic peak starting at 25° C. and ending near 175° C. The enthalpy of this transition correlated with the observed BET surface area data.

The foams decomposed under nitrogen until a temperature of approximately 350° C. was reached. At that point, degradation was faster and led to a lower final carbonization mass for the foams synthesized at higher initiator concentrations. At 900° C., the carbonaceous product was between 32% and 48% of the original resorcinol-formaldehyde mass. This high carbon char content enabled the conversion of the resorcinol-formaldehyde foams into carbon foams with ultra-fine cell sizes and a density of 100 mg/cc or less. These carbonized aerogels also have a surface area of about 700 square meters/gm.

The aerogels or foams of the present invention are suitable for use in x-ray laser applications, adsorption of toxic gases, metal interspersion, as a foam carrier for a metal catalyst, and an ion exchanger and other similar applications.

It has thus been shown that resorcinol-formaldehyde aerogels of microcellular structure are easily produced in densities ranging from about 35 to about 100 mg/cc. These resorcinol-formaldehyde aerogels are composed of interconnected beads with diameters of 70–100 Å and cell size of less than 1000 Å. This structure is responsible for the transparency of these organic aerogels. These aerogels or foams may also be carbonized by heating them to high temperatures in a nitrogen atmosphere to yield microcellular carbon foams of very low densities.

The foregoing description of a preferred embodiment of the invention has been presented for purposes of illustration and description only. It is not intended to be exhaustive or to limit the invention to the precise form disclosed, and obviously many modifications and variations are possible in light of the above teaching. The particular embodiment was chosen and described in order to best explain the principles of the invention and its practical application thereby to enable others skilled in the art to best utilize the invention in various embodiments and with various modifications as are suited to the particular use contemplated. It is intended that the scope of the invention be defined by the claims appended hereto.

What is claimed is:

1. A process for the synthesis of a low density, organic aerogel of ultra-fine pore size, said process comprising the steps of:
   mixing in a predetermined ratio a polyhydroxy benzene and formaldehyde in the presence of a base catalyst;
   heating the mixture to a predetermined temperature for a sufficiently long period of time to form a stable gel;
   washing the gel in a suitable organic solvent to exchange the aqueous solvent for the organic solvent;
   critical point drying the gel; and
   characterizing the gel.

2. The process of claim 1, wherein the pH of said mixture is in the range of about 6.5 to about 7.4.

3. The process of claim 2, wherein the polyhydroxy benzene is a dihydroxy benzene.

4. The process of claim 3, wherein said dihydroxy benzene is selected from the group consisting of resorcinol, catechol, substituted resorcinol, substituted catechol and mixtures thereof.

5. The process of claim 4, wherein said dihydroxy benzene is resorcinol.

6. The process of claim 5, wherein said solvent is selected from the group consisting of methanol, acetone, isopropanol and amyl acetate.

7. The process of claim 6, wherein said solvent is acetone.

8. The process of claim 7, wherein the ratio of said resorcinol to said formaldehyde is about 1:2.

9. The process of claim 8, wherein said base catalyst is sodium carbonate.

10. The process of claim 9, further comprising the step of heating said aerogel in a nitrogen atmosphere, to a temperature in the range of about 600° to about 1200° C. to carbonize said aerogel and form a low density, carbon foam.

11. The process of claim 4, wherein said dihydroxy benzene is a mixture of resorcinol and catechol.

12. The process of claim 4, wherein said dihydroxy benzene is a mixture of resorcinol and hydroquinone.

13. The process of claim 4, wherein said dihydroxy benzene is a mixture of resorcinol and phloroglucinol.

14. A process for the synthesis of a low density, microcellular resorcinol-formaldehyde aerogel, said process comprising the steps of:

(a) mixing resorcinol and formaldehyde in a molar ratio of about 1:2, in the presence of catalytic amounts of sodium carbonate;
(b) adjusting the pH of the mixture to a value in the range of about 6.5 to about 7.4;
(c) decanting the mixture into a glass ampoule;
(d) sealing the glass ampoule;
(e) heating the mixture to about 85° C. in an oven for about seven days to facilitate formation of a gel;
(f) removing the ampoule from the oven and cooling it to room temperature;
(g) breaking the ampoule and removing the gel from the ampoule;
(h) washing the gel in an agitated bath of trifluoroacetic acid at 45° C. for three days;
(i) transferring the gel from the acid bath to an agitated acetone bath maintained at about 45° C., to remove water;
(j) removing the gel from the acetone bath and critical point drying the gel; and
(k) characterizing the gel.

15. The process of claim 14, further comprising the step of heating said aerogel in a nitrogen atmosphere to a temperature in the range of about 600° to about 1200° C. to carbonize said aerogel and form a low density, carbon foam.

* * * * *